US012539250B1

(12) United States Patent
Shao

(10) Patent No.: US 12,539,250 B1
(45) Date of Patent: Feb. 3, 2026

(54) ROTATING, SUCKING AND VIBRATING MASSAGER

(71) Applicant: Shenzhen Hijoy Technology Co., Ltd., Shenzhen (CN)

(72) Inventor: Zhubiao Shao, Shenzhen (CN)

(73) Assignee: Shenzhen Hijoy Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/208,532

(22) Filed: May 14, 2025

(30) Foreign Application Priority Data

Apr. 9, 2025 (CN) ......................... 202520655570.8

(51) Int. Cl.
*A61H 19/00* (2006.01)
*A61H 9/00* (2006.01)
*A61H 23/02* (2006.01)

(52) U.S. Cl.
CPC ........... *A61H 19/32* (2013.01); *A61H 9/0057* (2013.01); *A61H 23/02* (2013.01); *A61H 2201/0107* (2013.01); *A61H 2201/1238* (2013.01); *A61H 2201/1463* (2013.01); *A61H 2201/1671* (2013.01); *A61H 2201/1695* (2013.01); *A61H 2201/5007* (2013.01)

(58) Field of Classification Search
CPC ........ A61H 19/00; A61H 19/32; A61H 19/50; A61H 9/0057; A61H 23/02; A61H 2201/0107; A61H 2201/1238; A61H 2201/1463; A61H 2201/1671; A61H 2201/1695
See application file for complete search history.

(56) References Cited

U.S. PATENT DOCUMENTS

| | | | | |
|---|---|---|---|---|
| 7,238,162 B2 * | 7/2007 | Dehli | A61F 7/00 | 601/72 |
| 8,282,583 B2 * | 10/2012 | Tsai | A61H 7/004 | 601/84 |
| 11,737,949 B1 * | 8/2023 | Huang | A61H 19/32 | 600/38 |
| 11,752,063 B1 * | 9/2023 | Huang | A61H 19/32 | 600/38 |
| 11,857,483 B1 * | 1/2024 | Huang | A61H 19/32 | |
| 2005/0288611 A1 * | 12/2005 | Fang | A61H 19/40 | 601/69 |
| 2006/0287616 A1 * | 12/2006 | Nan | A61H 23/0263 | 600/38 |

(Continued)

*Primary Examiner* — Timothy A Stanis
*Assistant Examiner* — Tyler A Raubenstraw

(57) ABSTRACT

Provided is a rotating, sucking and vibrating massager, which relates to the technical field of massage equipment. The massager comprises a massager body, comprising a main power unit, a rotating head, a cup body, a manual massager cup and a cup lid. The bottom of the main power unit is detachably connected to the rotating head; the cup body is detachably connected to the main power unit at one end and the manual massager cup at the other end, and provided with a cavity I inside. The massager can perform rotating, sucking or vibrating massage alone or simultaneously, or in any combination. The massager can be disassembled for easy carrying. The manual massager cup can be used independently, and the manual silicone sleeve inside is replaceable, so as to give users freedom of DIY massage functions. This design improves the market competitiveness of the massager product and meets user needs.

9 Claims, 7 Drawing Sheets

(56) References Cited

U.S. PATENT DOCUMENTS

| | | | | |
|---|---|---|---|---|
| 2009/0234182 | A1* | 9/2009 | Buchholz | A61H 19/00 705/40 |
| 2013/0261385 | A1* | 10/2013 | Zipper | A61H 23/0263 600/38 |
| 2016/0183671 | A1* | 6/2016 | Skidmore | A61H 7/005 173/162.2 |
| 2017/0056145 | A1* | 3/2017 | Sedic | A61C 17/3481 |
| 2018/0344565 | A1* | 12/2018 | Sloan | A61H 19/32 |
| 2019/0117495 | A1* | 4/2019 | Zhang | A61H 9/0057 |
| 2020/0046599 | A1* | 2/2020 | Sedic | A61F 5/41 |
| 2021/0186798 | A1* | 6/2021 | Tang | A61H 19/32 |
| 2021/0401409 | A1* | 12/2021 | Nakamura | A61B 10/0058 |
| 2022/0313541 | A1* | 10/2022 | Sloan | H04N 21/42201 |
| 2023/0044372 | A1* | 2/2023 | Liu | A61H 9/0007 |
| 2023/0126338 | A1* | 4/2023 | Shao | A61H 15/0078 600/38 |
| 2023/0355466 | A1* | 11/2023 | Cheng | A61F 7/007 |
| 2023/0372191 | A1* | 11/2023 | Gu | A61H 9/0078 |
| 2024/0099930 | A1* | 3/2024 | Luo | A61H 7/00 |
| 2024/0245576 | A1* | 7/2024 | Marshall | A61H 15/0078 |
| 2024/0415498 | A1* | 12/2024 | Chen | A61H 19/32 |

* cited by examiner

ROTATING, SUCKING AND VIBRATING MASSAGER

RELATED APPLICATIONS

The present application claims the benefit of priority of Chinese Patent Application No. 202520655570.8, filed Apr. 9, 2025, and entitled "ROTATING, SUCKING AND VIBRATING MASSAGER," the entire content of which is incorporated herein by reference.

TECHNICAL FIELD

The present disclosure relates to the technical field of massage equipment, and specifically, a rotating, sucking and vibrating massager.

BACKGROUND

Rotating, sucking and vibrating massagers are local tissue massage devices integrated with multimodal physical stimulation technology. They are mainly used in the field of male reproductive healthcare, covering scenarios such as physiological function assistance, blood circulation improvement and tissue rehabilitation.

At present, massagers for local tissue massage on the market are featured by relatively simple functions, as one massager has the function of either vibrating or rotating alone, or a combination of rotating and sucking at most, resulting in a relatively single user experience. As the user demands are becoming increasingly picky, the massagers cannot achieve the ideal use effect.

SUMMARY

In order to achieve the above purpose, the present disclosure provides the following technical solutions: A rotating, sucking and vibrating massager, comprising a massager body, wherein the massager body comprises a main power unit, a rotating head, a cup body, a manual massager cup and a cup lid, wherein the bottom of the main power unit is detachably connected to the rotating head, one end of the cup body is detachably connected to the main power unit, the other end of the cup body is detachably connected to the manual massager cup, the cup body is provided with a cavity I inside, and the rotating head and the manual massager cup are provided with a cavity II inside respectively;

- the main power unit comprises an air pump, a reducer motor and a pressure relief valve, wherein the air pump is used to extract the air inside the cavity I and the cavities II, and the pressure relief valve is used to connect the outside air with the cavity I and the cavities II; and
- the rotating head comprises a rotating silicone sleeve and a vibrator inside the rotating silicone sleeve.

As a preferred technical solution of the disclosure, the main power unit further comprises a main shell and a sub-shell, wherein the sub-shell is provided at the bottom of the main shell, an electrical case is provided on the top of the sub-shell, the air pump, the reducer motor and the pressure relief valve are all provided inside the electrical case, and a lithium battery opposite to the position of the pressure relief valve is also provided inside the electrical case.

As a preferred technical solution of the disclosure, the main shell is provided with a main PCB board inside on one side of the lithium battery, a control panel corresponding to the main PCB board is embedded on one side of the main shell, a top cover is provided on the top of the main shell, and a charging interface extending from the top end to the inside of the top cover is provided inside the main shell.

As a preferred technical solution of the disclosure, a main gear is provided at the output end of the reducer motor, and a sub-gear engaged with the main gear is rotatably provided inside the sub-shell.

As a preferred technical solution of the disclosure, a driver case is provided at the bottom of the sub-gear, an adapter PCB board is provided inside the driver case, and a plurality of locking sockets and driving grooves are provided at intervals on the outer circle of the driver case.

As a preferred technical solution of the disclosure, the rotating head further comprises a rotating case, a connector is provided on the top of the rotating case, and a plurality of clamp blocks and driving bulges are provided at intervals on one circle of the inner wall of the connector, and the locking blocks and the driving bulges are movably locked with the locking sockets and the driving grooves respectively.

As a preferred technical solution of the disclosure, the rotating silicone sleeve is provided inside the rotating case, bionic bumps I are provided inside the rotating silicone sleeve, one end of the rotating silicone sleeve extends to the inside of the cup body, a cover plate and a rotating PCB board on the top of the rotating silicone sleeve are provided inside the rotating case, and the rotating PCB board is electrically connected to the adapter PCB board.

As a preferred technical solution of the disclosure, the manual massager cup comprises an outer shell and a manual silicone sleeve inside the outer shell, the manual silicone sleeve is provided with bionic bumps II inside, one end of the manual silicone sleeve extends to the inside of the cup body and contacts one end of the rotating silicone sleeve, one end lid is provided at one end of the outer shell, and an outer shell decorative sleeve is provided outside the outer shell.

As a preferred technical solution of the disclosure, bayonet locking pegs I are provided inside both ends of the cup body, bayonet locking grooves are provided at one end of the sub-shell and both ends of the outer shell, the two ends of the cup body are respectively movably locked with the sub-shell and the outer shell through the bayonet locking pegs I and the bayonet locking grooves, and a sub-shell decorative sleeve is also provided on the outside of the sub-shell.

As a preferred technical solution of the disclosure, the massager further comprises a cup lid, the inner wall of the cup lid is provided with bayonet locking pegs II, and the cup lid is movably locked with one end of the outer shell away from the cup body through the bayonet locking pegs II and the bayonet locking grooves.

Compared with the prior art, the present disclosure provides a rotating, sucking and vibrating massager, which has the following beneficial effects:

In the electric mode, the rotating, sucking and vibrating massager can perform the massage functions of rotating, sucking and vibrating at the same time, or in any combination, such as rotating, sucking or vibrating alone, rotating and sucking, rotating and vibrating, and sucking and vibrating. The massager can be disassembled into multiple sections for easy carrying and transportation. After the massager is disassembled, the manual massager cup can be used independently, and the manual silicone sleeve inside the manual massager cup is also replaceable, so as to give users full freedom of DIY massage functions. This multi-functional design improves the market competitiveness of the massager product and meets user needs.

Legend: 1. massager body; 11. main power unit; 111. air pump; 112. reducer motor; 1121. main gear; 113. pressure relief valve; 114. main shell; 1141. control panel; 1142. top cover; 1143. charging interface; 115. sub-shell; 1151. sub-shell decorative sleeve; 116. electrical case; 117. lithium battery; 118. main PCB board; 119. sub-gear; 1191. driver case; 1192. adapter PCB board; 1193. locking socket; 1194. driving groove; 12. rotating head; 121. rotating silicone sleeve; 122. vibrator; 123. rotating case; 124. connector; 125. locking block; 126. driving bulge; 127. bionic bump I; 128. cover plate; 129. rotating PCB board; 13. cup body; 131. cavity I; 14. manual massager cup; 141. outer shell; 142. manual silicone sleeve; 143. bionic bump II; 144. end lid; 145. outer shell decorative sleeve; 15. cup lid; 16. bayonet locking peg I; 17. bayonet locking slot; 18. bayonet locking peg II; 19. cavity II.

DETAILED DESCRIPTION

The technical solutions in the embodiments of the present disclosure will be clearly and completely described below with reference to the drawings in the embodiments of the present disclosure. Obviously, the embodiments described are only a part of, not all, the embodiments of the present disclosure. Based on the embodiments described herein, all other embodiments obtained by those of ordinary skill in the art without creative work are within the scope of the present disclosure.

Figure 1:
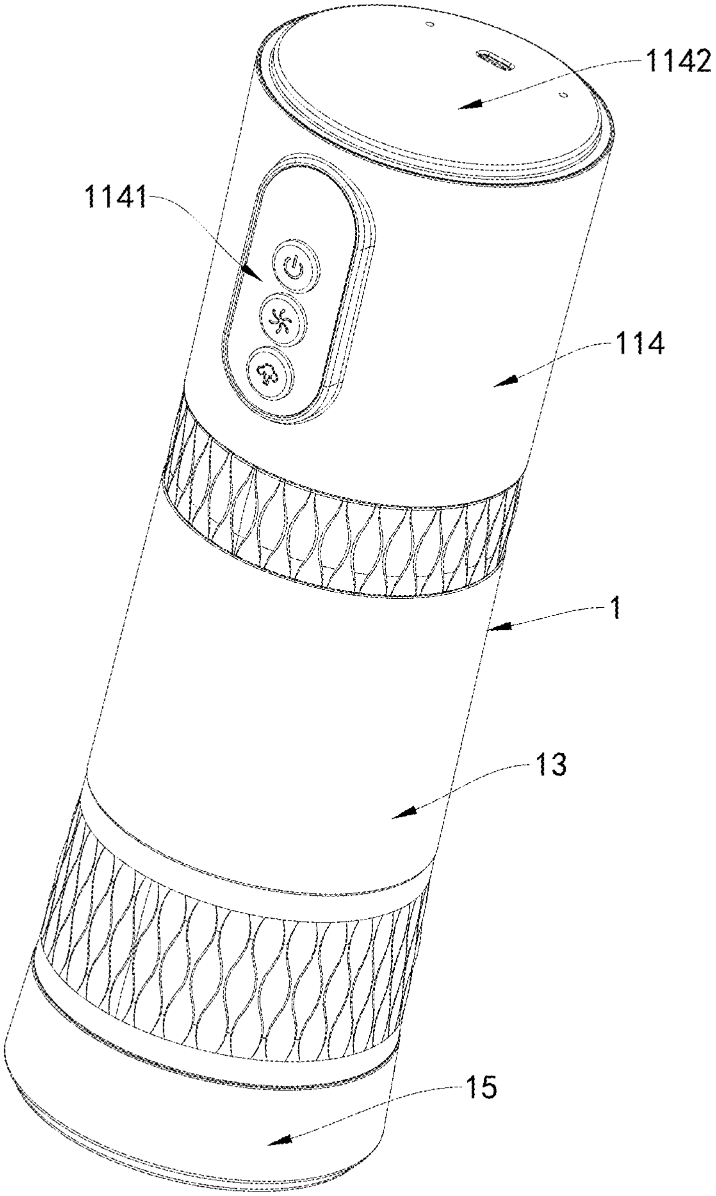
FIG. 1 is a schematic diagram of the structure of a rotating, sucking and vibrating massager according to the present disclosure.
Figure 2:
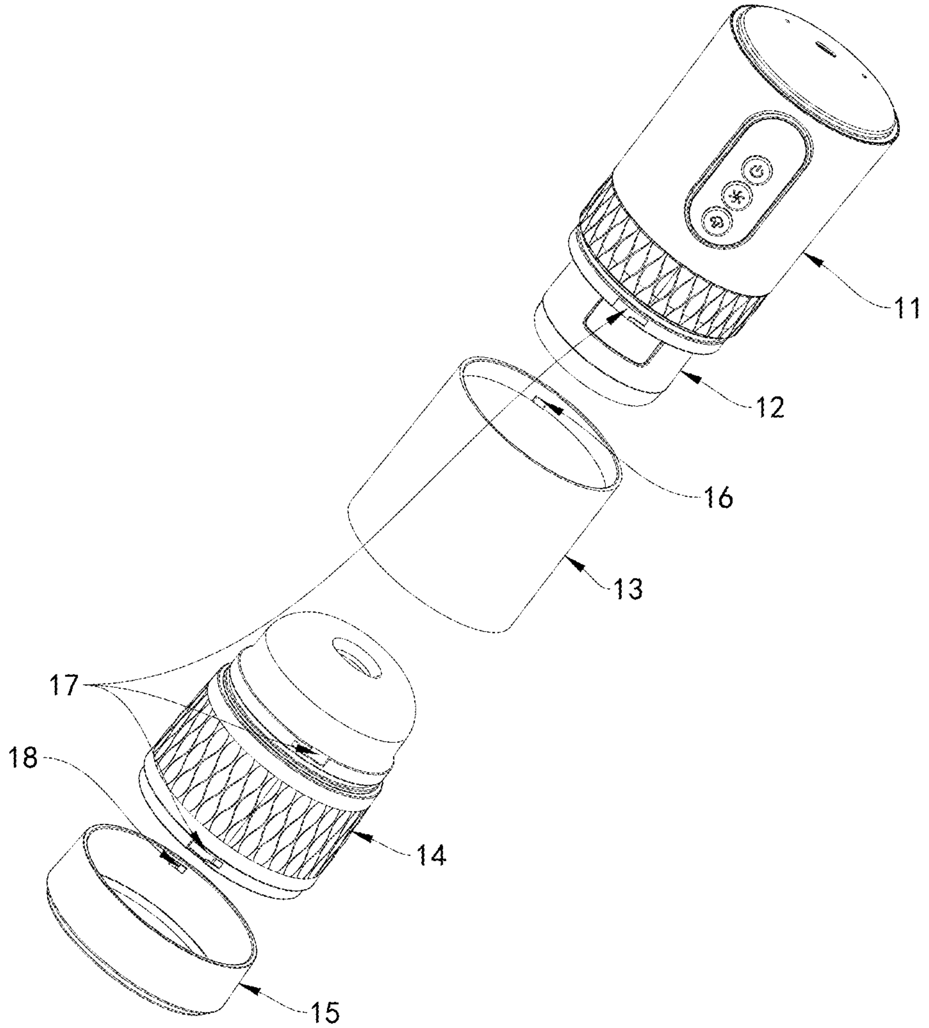
FIG. 2 is a schematic diagram of the main power unit, cup body, manual massager cup and cup lid of a rotating, sucking and vibrating massager according to the present disclosure in a disassembled state.
Figure 3:
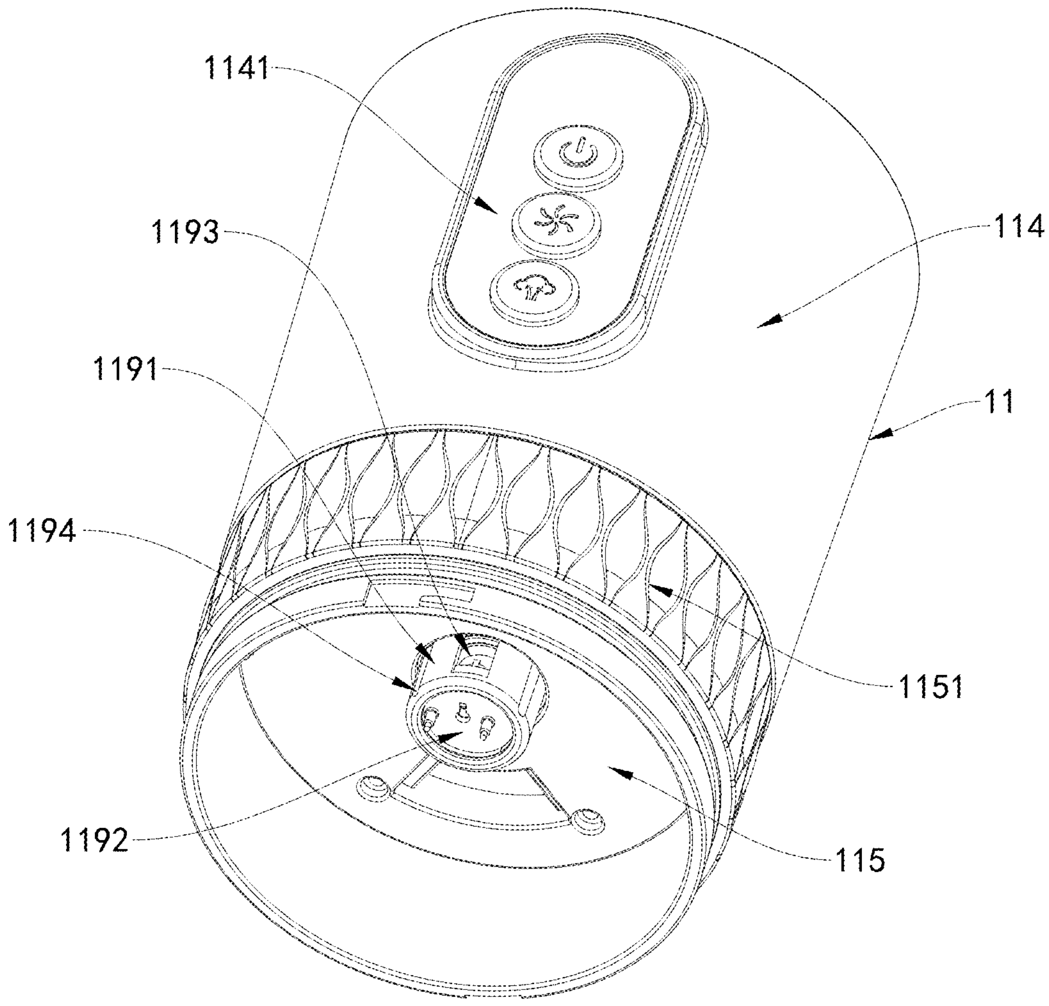
FIG. 3 is a schematic diagram of the structure of the main power unit of a rotating, sucking and vibrating massager according to the present disclosure.
Figure 4:
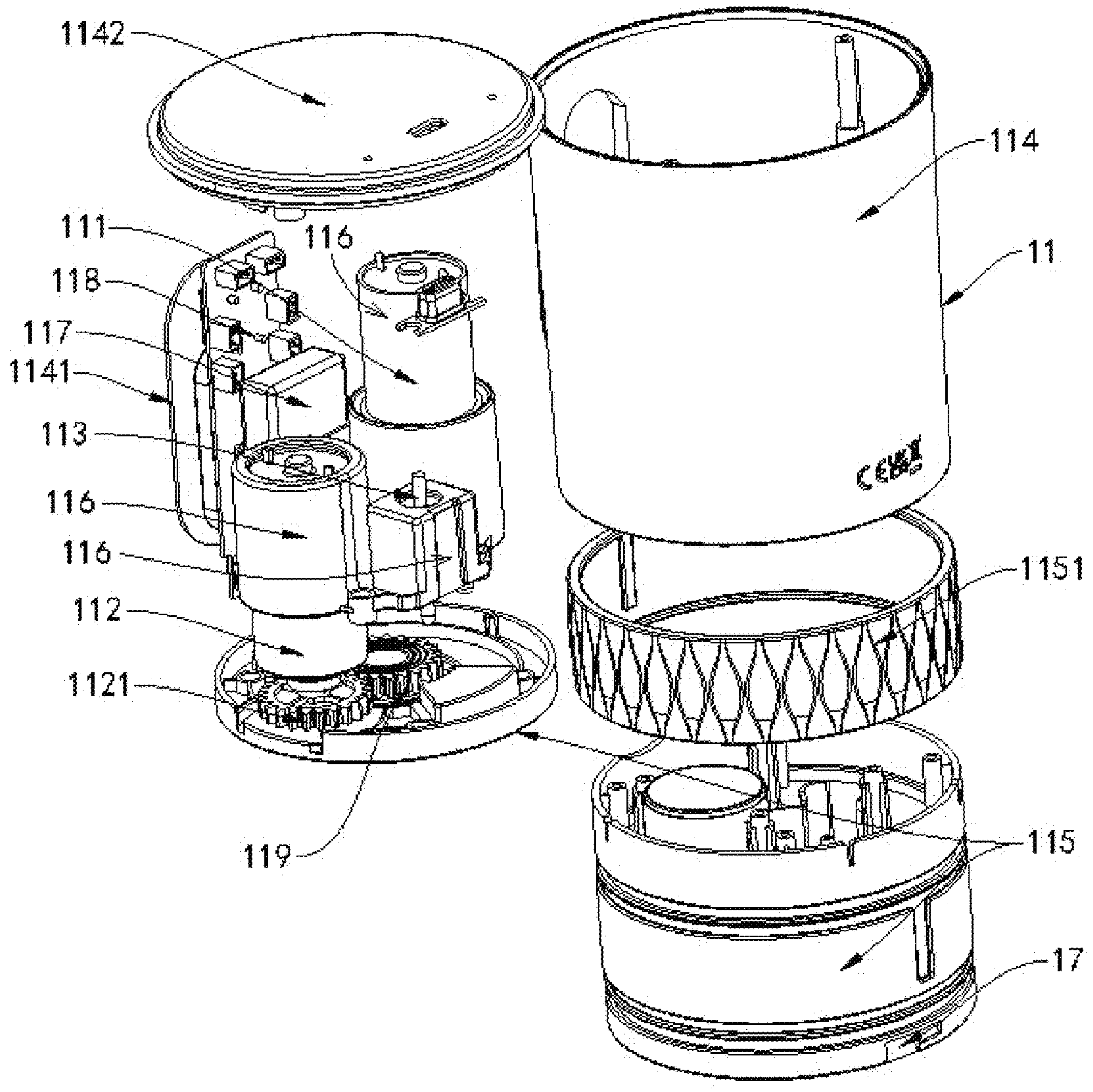
FIG. 4 is a schematic diagram of the internal structure of the main power unit of a rotating, sucking and vibrating massager according to the present disclosure.
Figure 5:
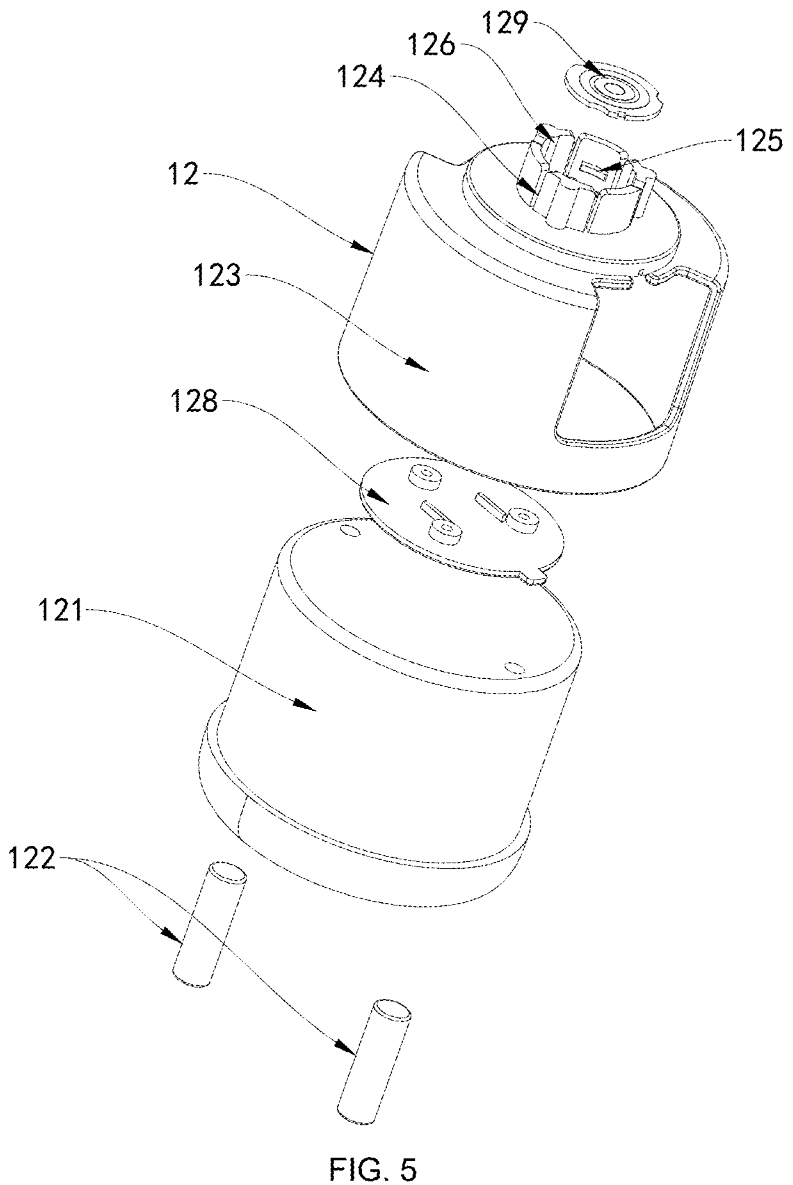
FIG. 5 is an exploded view of the structure of the rotating head of a rotating, sucking and vibrating massager according to the present disclosure.
Figure 6:
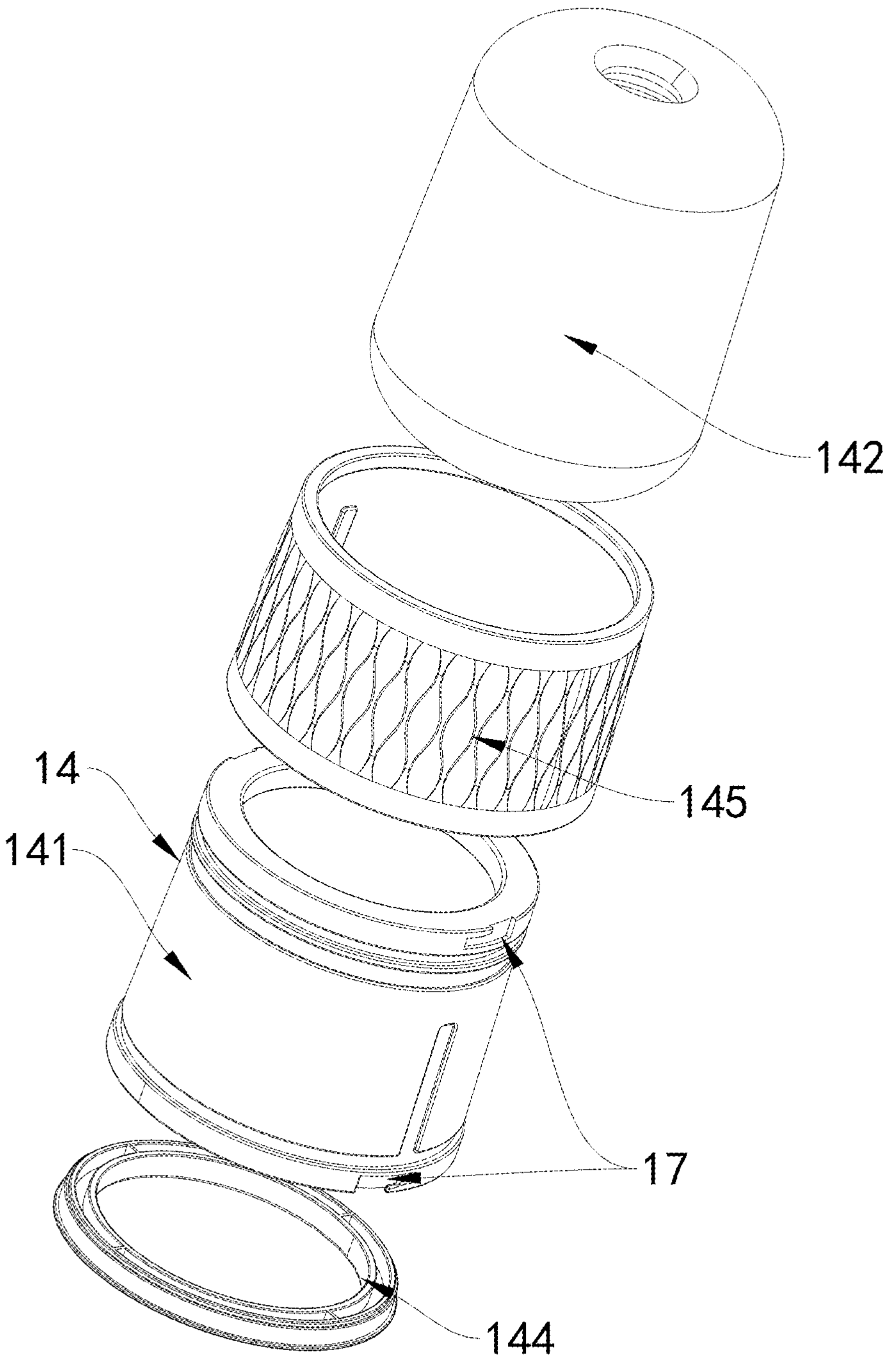
FIG. 6 is an exploded view of the structure of the manual massager cup of a rotating, sucking and vibrating massager according to the present disclosure.
Figure 7:
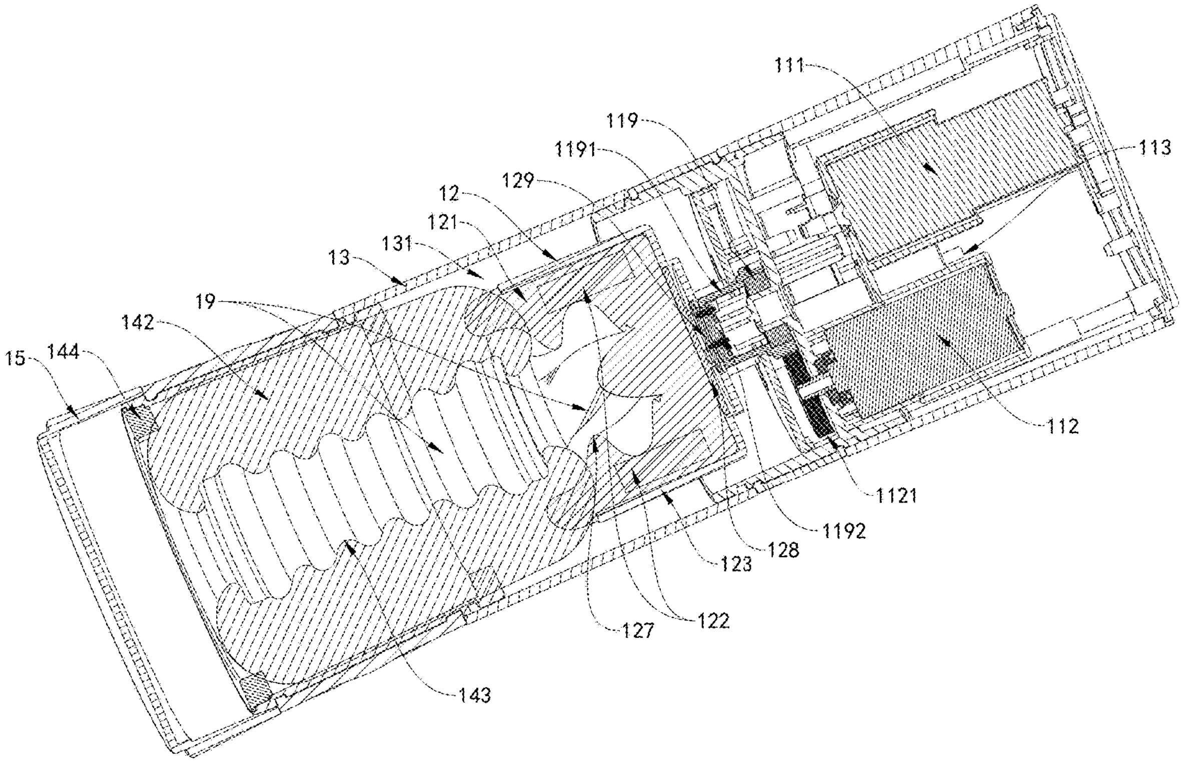
FIG. 7 is a cross-sectional view of the structure of the massager body of a rotating, sucking and vibrating massager according to the present disclosure.

Please refer to FIGS. 1 to 7 for a rotating, sucking and vibrating massager provided in the present disclosure, comprising a massager body 1, wherein the massager body 1 comprises a main power unit 11, a rotating head 12, a cup body 13, a manual massager cup 14 and a cup lid 15, wherein the bottom of the main power unit 11 is detachably connected to the rotating head 12, one end of the cup body 13 is detachably connected to the main power unit 11, the other end of the cup body 13 is detachably connected to the manual massager cup 14, the cup body 13 is provided with a cavity I 131 inside, and the rotating head 12 and the manual massager cup 14 are provided with a cavity II 19 inside respectively.

The main power unit 11 comprises an air pump 111, a reducer motor 112 and a pressure relief valve 113, wherein the air pump 111 is used to extract the air inside the cavity I 131 and the cavities II 19, and the pressure relief valve 113 is used to connect the outside air with the cavity I 131 and the cavities II 19.

The rotating head 12 comprises a rotating silicone sleeve 121 and a vibrator 122 inside the rotating silicone sleeve 121.

When the massager is turned on, the lithium battery 117 provides electric power to drive the reducer motor 112, the air pump 111, the pressure relief valve 113, and the vibrator 122 to work. The reducer motor 112 performs rotating massage. When the reducer motor 112 is working, it drives the rotating silicone sleeve 121 to rotate via the rotating case 123, and the bionic bumps I 127 inside the rotating silicone sleeve 121 perform rotating massage on the human body. The air pump 111 and the pressure relief valve 113 perform cyclic sucking massage. When the air pump 111 is working, it draws away part of the air from the cavity I 131 of the cup body 13 and from the cavities II 19 of the manual silicone sleeve 142 and the rotating silicone sleeve 121, to form a negative pressure relative to the air outside, and the manual silicone sleeve 142 and the rotating silicone sleeve 121 will be compressed and contracted. When the pressure relief valve 113 is working, the pressure relief valve 113 opens the channel to allow the air outside to enter the cavity I 131 of the cup body 13 and the cavities II 19 of the manual silicone sleeve 142 and the rotating silicone sleeve 121. When the internal and external air pressures gradually reach equilibrium, the manual silicone sleeve 142 and the rotating silicone sleeve 121 in the cup body 13 gradually return to their original state from the contracted state. This continuous cycling of contraction and expansion results in an effect similar to sucking, and then the bionic bumps I 127 and the bionic bumps II 143 can perform sucking massage on human body. The vibrator 122 provides vibrating massage. As the vibrator 122 is installed in the rotating silicone sleeve 121, when the vibrator 122 works, it drives the rotating silicone sleeve 121 to vibrate together, and the bionic bumps I 127 in the rotating silicone sleeve 121 can perform vibrating massage on the human body.

As a specific technical solution of the embodiment, the main power unit 11 further comprises a main shell 114 and a sub-shell 115, wherein the sub-shell 115 is provided at the bottom of the main shell 114, an electrical case 116 is provided on the top of the sub-shell 115, the air pump 111, the reducer motor 112 and the pressure relief valve 113 are all provided inside the electrical case 116, and a lithium battery 117 opposite to the position of the pressure relief valve 113 is also provided inside the electrical case 116.

In this embodiment, the electrical case 116 is used to accommodate the air pump 111, the reducer motor 112, the pressure relief valve 113 and the lithium battery 117, so as to ensure the assembly stability of the air pump 111, the reducer motor 112, the pressure relief valve 113 and the lithium battery 117.

After they are assembled, the air pump 111 is opposite to the reducer motor 112, and the lithium battery 117 is opposite to the pressure relief valve 113. The air pump 111, the reducer motor 112, the pressure relief valve 113, the charging interface 1143, the lithium battery 117 and the adapter PCB board 1192 are all electrically connected to the main PCB board 118, and the main PCB board 118 controls the air pump 111, the reducer motor 112, the pressure relief valve 113, and the vibrator 122 to work in a cooperative manner.

As a specific technical solution of the embodiment, the main shell 114 is provided with a main PCB board 118 inside on one side of the lithium battery 117, a control panel 1141 corresponding to the main PCB board 118 is embedded on one side of the main shell 114, a top cover 1142 is provided on the top of the main shell 114, and a charging interface 1143 extending from the top end to the inside of the top cover 1142 is provided inside the main shell 114.

In this embodiment, the buttons on the main PCB board 118 can be operated through the control panel 1141, and the power cord can be connected through the charging interface 1143 to charge the lithium battery 117. The main PCB board 118 is used to control the operation of the vibrator 122, the reducer motor 112, the air pump 111 and the pressure relief valve 113. The user can select the required massage mode with the control panel 1141. In the electric mode, the massager cannot only perform rotating, sucking and vibrating at the same time, but also in any combination, such as rotating or sucking alone, or sucking and vibrating.

As a specific technical solution of the embodiment, a main gear 1121 is provided at the output end of the reducer motor 112, and a sub-gear 119 engaged with the main gear 1121 is rotatably provided inside the sub-shell 115.

In this embodiment, when the reducer motor 112 is started, and the reducer motor 112 drives the main gear 1121 to rotate, the main gear 1121 drives the sub-gear 119 to rotate, and the sub-gear 119 drives the rotating head 12 to rotate via the driver case 1191, for rotating massage.

As a specific technical solution of this embodiment, a driver case 1191 is provided at the bottom of the sub-gear 119, an adapter PCB board 1192 is provided inside the driver case 1191, a plurality of locking sockets 1193 and driving grooves 1194 are provided at intervals on the outer circle of the driver case 1191, the rotating head 12 further comprises a rotating case 123, a connector 124 is provided on the top of the rotating case 123, and a plurality of clamp blocks 125 and driving bulges 126 are provided at intervals on one circle of the inner wall of the connector 124, and the locking blocks 125 and the driving bulges 126 are movably locked with the locking sockets 1193 and the driving grooves 1194 respectively.

In this embodiment, the adapter PCB board 1192 inside the driver case 1191 is electrically connected to the rotating PCB board 129 through contacts, and the rotating head 12 and the main power unit 11 are connected in a locking manner, to facilitate later maintenance and replacement. During installation, the connector 124 is aligned with the driver case 1191, and then the locking blocks 125 are aligned with the locking sockets 1193. When the locking blocks 125 are aligned with the locking sockets 1193, the driving bulges 126 are naturally aligned with the driving grooves 1194. When the connector 124 and the driver case 1191 are pushed relatively, the connector 124 is sleeved on the outside of the driver case 1191, at the same time, the locking blocks 125 are locked with the locking sockets 1193, and the driving bulges 126 are locked with the driving grooves 1194. When the driver case 1191 rotates, it drives the connector 124 and the rotating case 123 to rotate through the locking blocks 125 and the driving bulges 126. The rotating case 123 drives the rotating silicone sleeve 121 therein to massage the body part that the user needs to massage.

As a specific technical solution of this embodiment, the rotating silicone sleeve 121 is provided inside the rotating case 123, bionic bumps I 127 are provided inside the rotating silicone sleeve 121, one end of the rotating silicone sleeve 121 extends to the inside of the cup body 13, a cover plate 128 and a rotating PCB board 129 on the top of the rotating silicone sleeve 121 are provided inside the rotating case 123, and the rotating PCB board 129 is electrically connected to the adapter PCB board 1192.

In this embodiment, the setting of the bionic bumps I 127 ensures the massage effect of the rotating silicone sleeve 121. The adapter PCB board 1192 is limited by the stud in the middle of the sub-shell 115 inside the rotating frame and cannot rotate. The adapter PCB board 1192 is used to connect the circuit of the vibrator 122. The adapter PCB board 1192 rotates with the rotating case 123 and reaches the bottom through the contact point design. The rotating head 12 can achieve vibrating massage while rotating.

As a specific technical solution of this embodiment, the manual massager cup 14 comprises an outer shell 141 and a manual silicone sleeve 142 inside the outer shell 141, the manual silicone sleeve 142 is provided with bionic bumps II 143 inside, one end of the manual silicone sleeve 142 extends to the inside of the cup body 13 and contacts one end of the rotating silicone sleeve 121, one end lid 144 is provided at one end of the outer shell 141, and an outer shell decorative sleeve 145 is provided outside the outer shell 141.

In this embodiment, the bionic bumps II 143 are set to ensure the massage effect of the manual silicone sleeve 142. After the manual silicone sleeve 142 is assembled with the main power unit, the manual silicone sleeve 142 contacts the rotating silicone sleeve 121, and can simultaneously perform the massage functions of sucking, rotation, and vibrating for a better massage effect. The end lid 144 can block one end of the manual silicone sleeve 142. The manual massager cup 14 can be removed independently for use as a manual massager, and it can also be used in combination with the main power unit. The manual silicone sleeve 142 inside the manual massager cup 14 can also be replaced independently, to give the user full freedom of DIY massage function.

As a specific technical solution of this embodiment, bayonet locking pegs I 16 are provided inside both ends of the cup body 13, bayonet locking grooves 17 are provided at one end of the sub-shell 115 and both ends of the outer shell 141, the two ends of the cup body 13 are respectively movably connected with the sub-shell 115 and the outer shell 141 through the bayonet locking pegs I 16 and the bayonet locking grooves 17, a sub-shell decorative sleeve 1151 is also provided on the outside of the sub-shell 115, the massager further comprises a cup lid 15, the inner wall of the cup lid 15 is provided with bayonet locking pegs II 18, and the cup lid 15 is movably locked with one end of the outer shell 141 away from the cup body 13 through the bayonet locking pegs II 18 and the bayonet locking grooves 17.

In this embodiment, the bayonet locking pegs I 16, the bayonet locking pegs II 18 and the bayonet locking grooves 17 are set to enable the entire massager to be split into four sections, namely the main power unit, the cup body 13, the manual massager cup 14 and the cup lid 15, for the convenience of storage and carrying, and at the same time for the user's convenience of cleaning. The bayonet locking grooves 17 are L-shaped. When the bayonet locking pegs I 16 and the bayonet locking pegs II 18 are aligned with and inserted into the bayonet locking grooves 17, they can be locked by rotating, which is a simple and convenient operation.

In summary, in the electric mode, the rotating, sucking and vibrating massager can perform the massage functions of rotating, sucking and vibrating at the same time, or in any combination, such as rotating, sucking or vibrating alone, rotating and sucking, rotating and vibrating, and sucking and vibrating. The massager can be disassembled into multiple sections for easy carrying and transportation. After the massager is disassembled, the manual massager cup 14 can be used independently, and the manual silicone sleeve 142 inside the manual massager cup 14 is also replaceable, so as to give users full freedom of DIY massage functions. This multi-functional design improves the market competitiveness of the massager product and meets user needs.

It should be noted that in this document, the terms such as “comprising”, “including” or any other variation thereof are intended to encompass non-exclusive inclusion such that a process, method, article or device comprising an array of elements includes not only those elements but also other elements not expressly listed therein or which are inherent in such process, method, article or device. Without further limitation, an element qualified by the phrase “comprising a” does not preclude the presence of additional identical elements in the process, method, article or device that include such an element.

Although embodiments of the present disclosure have been shown and described, it will be understood by those of ordinary skill in the art that many changes, modifications, substitutions and variations can be made to these embodiments without departing from the principle and spirit of the present disclosure, and the scope of the present disclosure is defined by the appended claims and their equivalents.

What is claimed is:

1. A rotating, sucking and vibrating massager, comprising a massager body, wherein the massager body comprises a main power unit, a rotating head, a cup body, a manual massager cup and a cup lid, wherein the bottom of the main power unit is detachably connected to the rotating head, one end of the cup body is detachably connected to the main power unit, the other end of the cup body is detachably connected to the manual massager cup, the cup body is provided with a cavity I inside, and the rotating head and the manual massager cup are provided with a cavity II inside respectively;

the main power unit comprises an air pump, a reducer motor and a pressure relief valve, wherein the air pump is used to extract the air inside the cavity I and the cavities cavity II, and the pressure relief valve is used to connect the outside air with the cavity I and the cavity II; and the rotating head comprises a rotating silicone sleeve and a vibrator inside the rotating silicone sleeve;

wherein the main power unit further comprises a main shell and a sub-shell, wherein the sub-shell is provided at the bottom of the main shell, an electrical case is provided on the top of the sub-shell, the air pump, the reducer motor and the pressure relief valve are all provided inside the electrical case, and a lithium battery opposite to the position of the pressure relief valve is also provided inside the electrical case.

2. The rotating, sucking and vibrating massager according to claim 1, wherein the main shell is provided with a main PCB board inside on one side of the lithium battery, a control panel corresponding to the main PCB board is embedded on one side of the main shell, a top cover is provided on the top of the main shell, and a charging interface extending from the top end to the inside of the top cover is provided inside the main shell.

3. The rotating, sucking and vibrating massager according to claim 1, wherein a main gear is provided at the output end of the reducer motor, and a sub-gear engaged with the main gear is rotatably provided inside the sub-shell.

4. The rotating, sucking and vibrating massager according to claim 3, wherein a driver case is provided at the bottom of the sub-gear, an adapter PCB board is provided inside the driver case, and a plurality of locking sockets and driving grooves are provided at intervals on the outer circle of the driver case.

5. The rotating, sucking and vibrating massager according to claim 4, wherein the rotating head further comprises a rotating case, a connector is provided on the top of the rotating case, and a plurality of clamp blocks and driving bulges are provided at intervals on one circle of the inner wall of the connector, and the locking blocks and the driving bulges are movably locked with the locking sockets and the driving grooves respectively.

6. The rotating, sucking and vibrating massager according to claim 5, wherein the rotating silicone sleeve is provided inside the rotating case, bionic bumps I are provided inside the rotating silicone sleeve, one end of the rotating silicone sleeve extends to the inside of the cup body, a cover plate and a rotating PCB board on the top of the rotating silicone sleeve are provided inside the rotating case, and the rotating PCB board is electrically connected to the adapter PCB board.

7. The rotating, sucking and vibrating massager according to claim 1, wherein the manual massager cup comprises an outer shell and a manual silicone sleeve inside the outer shell, the manual silicone sleeve is provided with bionic bumps II inside, one end of the manual silicone sleeve extends to the inside of the cup body and contacts one end of the rotating silicone sleeve, one end lid is provided at one end of the outer shell, and an outer shell decorative sleeve is provided outside the outer shell.

8. The rotating, sucking and vibrating massager according to claim 1, wherein bayonet locking pegs I are provided inside both ends of the cup body, bayonet locking grooves are provided at one end of the sub-shell and both ends of the outer shell, the two ends of the cup body are respectively movably locked with the sub-shell and the outer shell through the bayonet locking pegs I and the bayonet locking grooves, and a sub-shell decorative sleeve is also provided on the outside of the sub-shell.

9. The rotating, sucking and vibrating massager according to claim 1, wherein the inner wall of the cup lid is provided with bayonet locking pegs II, and the cup lid is movably locked with one end of the outer shell away from the cup body through the bayonet locking pegs II and the bayonet locking grooves.

* * * * *